US007489856B2

(12) United States Patent
Haller

(10) Patent No.: US 7,489,856 B2
(45) Date of Patent: Feb. 10, 2009

(54) ELECTRICAL DEVICE FOR AUTOMATICALLY ADJUSTING OPERATING SPEED OF A TOOL

(75) Inventor: William R. Haller, Bethlehem, PA (US)

(73) Assignee: Nokia Corporation, Espoo (FI)

( * ) Notice: Subject to any disclaimer, the term of this patent is extended or adjusted under 35 U.S.C. 154(b) by 29 days.

(21) Appl. No.: 10/877,636

(22) Filed: Jun. 25, 2004

(65) Prior Publication Data

US 2005/0286875 A1 Dec. 29, 2005

(51) Int. Cl.
  *H02P 7/00* (2006.01)
(52) U.S. Cl. .................. 388/827; 388/825; 388/828; 451/6; 451/8; 451/41; 81/487
(58) Field of Classification Search .............. 318/632, 318/637, 638, 640, 802, 806, 452, 456, 825, 318/826, 827, 828; 451/21, 8–10, 41, 6; 340/500, 678–680; 40/913; 408/16; 388/825, 388/827, 828; 415/9; 81/487
See application file for complete search history.

(56) References Cited

U.S. PATENT DOCUMENTS

| 3,634,664 | A | * | 1/1972 | Valek | 318/561 |
| 3,784,798 | A | * | 1/1974 | Beadle et al. | 700/173 |
| 4,031,368 | A | * | 6/1977 | Colding et al. | 700/173 |
| 4,207,567 | A | * | 6/1980 | Juengel et al. | 340/680 |
| 4,391,066 | A | * | 7/1983 | Munekata et al. | 451/5 |
| 4,514,797 | A | * | 4/1985 | Begin | 700/175 |
| 4,720,907 | A | * | 1/1988 | Rapp | 235/439 |
| 4,722,405 | A | * | 2/1988 | Langford, Jr. | 175/374 |
| 4,742,470 | A |   | 5/1988 | Juengel | 364/474 |
| 4,745,557 | A |   | 5/1988 | Pekar et al. | 364/474 |
| RE32,837 | E |   | 1/1989 | Corni | 235/375 |
| 4,809,426 | A | * | 3/1989 | Takeuchi et al. | 365/64 |
| 4,820,962 | A |   | 4/1989 | Millauer | 318/602 |
| 4,900,252 | A |   | 2/1990 | Liefke et al. | 433/27 |
| 4,926,950 | A | * | 5/1990 | Zijsling | 175/39 |

(Continued)

FOREIGN PATENT DOCUMENTS

DE    3518902 A1    11/1986

(Continued)

OTHER PUBLICATIONS

Christophe Basso: "Conducted EMI Filter Design for the NCP1200", ON Semiconductor, Apr. 2001—Rev.2 (16 pages).

(Continued)

*Primary Examiner*—Rita Leykin
(74) *Attorney, Agent, or Firm*—MacDonald Illig Jones & Britton LLP; Robert M. Bauer, Esq.

(57) ABSTRACT

Electrically powered devices are provided that are generally capable of automatically adjusting an operating speed of a tool removably connected to the device. The device includes circuitry that evaluates tool wear for the tool removably connected to the device, produces a tool wear speed related signal, and adjusts the operating speed of the tool based on the speed related signal. The device may further be capable of automatically setting the initial operating speed of the particular tool removably connected to the device by identifying the particular tool and setting the initial operating speed which may later be adjusted.

12 Claims, 8 Drawing Sheets

U.S. PATENT DOCUMENTS

| | | | | |
|---|---|---|---|---|
| 5,076,102 A | * | 12/1991 | Sato et al. | 73/587 |
| 5,208,761 A | * | 5/1993 | Michigami et al. | 700/179 |
| 5,354,961 A | * | 10/1994 | Diot et al. | 219/69.13 |
| 5,458,527 A | * | 10/1995 | Kondo et al. | 451/21 |
| 5,871,391 A | * | 2/1999 | Pryor | 451/9 |
| 6,060,859 A | | 5/2000 | Jonokuchi | 318/801 |
| 6,151,055 A | * | 11/2000 | Ackley et al. | 347/215 |
| 6,320,286 B1 | * | 11/2001 | Ramarathnam | 310/50 |
| 6,360,136 B1 | | 3/2002 | Lamers | 700/225 |
| 6,568,593 B2 | | 5/2003 | Hetzer | 235/385 |
| 6,633,379 B2 | * | 10/2003 | Roesner et al. | 356/301 |
| 2002/0037681 A1 | * | 3/2002 | Gitis et al. | 451/5 |
| 2002/0108474 A1 | * | 8/2002 | Adams | 81/487 |
| 2002/0186370 A1 | * | 12/2002 | Roesner et al. | 356/301 |
| 2003/0073382 A1 | * | 4/2003 | Manor | 451/6 |

FOREIGN PATENT DOCUMENTS

| | | | |
|---|---|---|---|
| WO | WO 94/02284 | * | 2/1994 |
| WO | WO 03/084047 | | 10/2003 |

OTHER PUBLICATIONS

Libor Prokop et al. "Sensorless BLDC Motor Control on MC68HC908MR32 Software Description" Motorola, Inc., 2002 (67 pages).

Laszlo Balogh: "Unitrode—UC3854A/B and UC3855A/B Provide Power Limiting With Sinusoidal Input Current for PFC Front Ends" SLUA196A—Jun. 1995—Revised Nov. 2001 (15 pages).

Office Action dated May 23, 2008 in European Patent Application No. 05 762 817.4-2007.

* cited by examiner

US 7,489,856 B2

ELECTRICAL DEVICE FOR AUTOMATICALLY ADJUSTING OPERATING SPEED OF A TOOL

FIELD OF THE INVENTION

The present invention generally relates to electrically powered devices. More particularly, the present invention relates to electrically powered devices with circuitry for automatically setting the operating speed of the device.

The lifetime and efficiency of many tools is determined to a great extent by the operating speed at which the tool is used. Electrically powered devices that drive the tools, however, usually have one or a discrete number of operating speeds for all tools and thus are not able to optimize the operating speed for a particular tool. Moreover, the speed of certain tools, such as grinding or cutoff wheels, change as the tool wears which further prevents the tool from being operated at an optimum speed. Accordingly, there is a need for electrically powered devices that include circuitry for adjusting the operating speed for a tool to compensate or account for tool wear thereby extending the useful life of the tool.

BRIEF SUMMARY

In one aspect of the invention electrically powered devices are provided that are generally capable of automatically adjusting an operating speed of a tool removably connected to the device. The device includes circuitry that evaluates tool wear for the tool removably connected to the device, produces a speed related signal based on the tool wear, and adjusts the operating speed of the tool based on the speed control signal.

In another aspect of the invention, electrically powered devices are provided that are capable of automatically adjusting an operating speed of a tool by evaluating the radius of the tool. The device includes circuitry that automatically adjusts that operating speed of the tool enables the tool to be operated at any one of a discrete number of operating speeds. The device further includes circuitry that adjusts the operating speed of the tool based on the determination of the radius of the wordking part.

In another aspect of the invention, methods for automatically adjusting the operating speed of a tool to coincide with preferences for increasing the operating speed of the tool.

DETAILED DESCRIPTION OF THE PREFERRED EMBODIMENTS

The preferred embodiments generally provide electrically powered devices that are capable of setting and/or adjusting the operating speed used to drive a tool driven by the electrically powered device to compensate for tool wear, automatically or otherwise. A tool as used herein generally refers to any functional item that is driven by an electrically powered device to perform relevant mechanical work therewith, such as cutting, drilling, grinding, etc. This aspect of the preferred embodiments beneficially allows an electrically powered device or a portion thereof to set and/or adjust the operating speed of the device to coincide with the operational limitations of the tool and/or operational preferences for using the tool. Although the preferred embodiments are described by way of example in relation to certain types of electrically powered devices, such as power tools, and more particularly to grinders with brushless DC ("BLDC") motors, it is understood that the preferred embodiments are generally applicable to a variety of different types of devices and is therefore not limited thereto.

Figure 1:
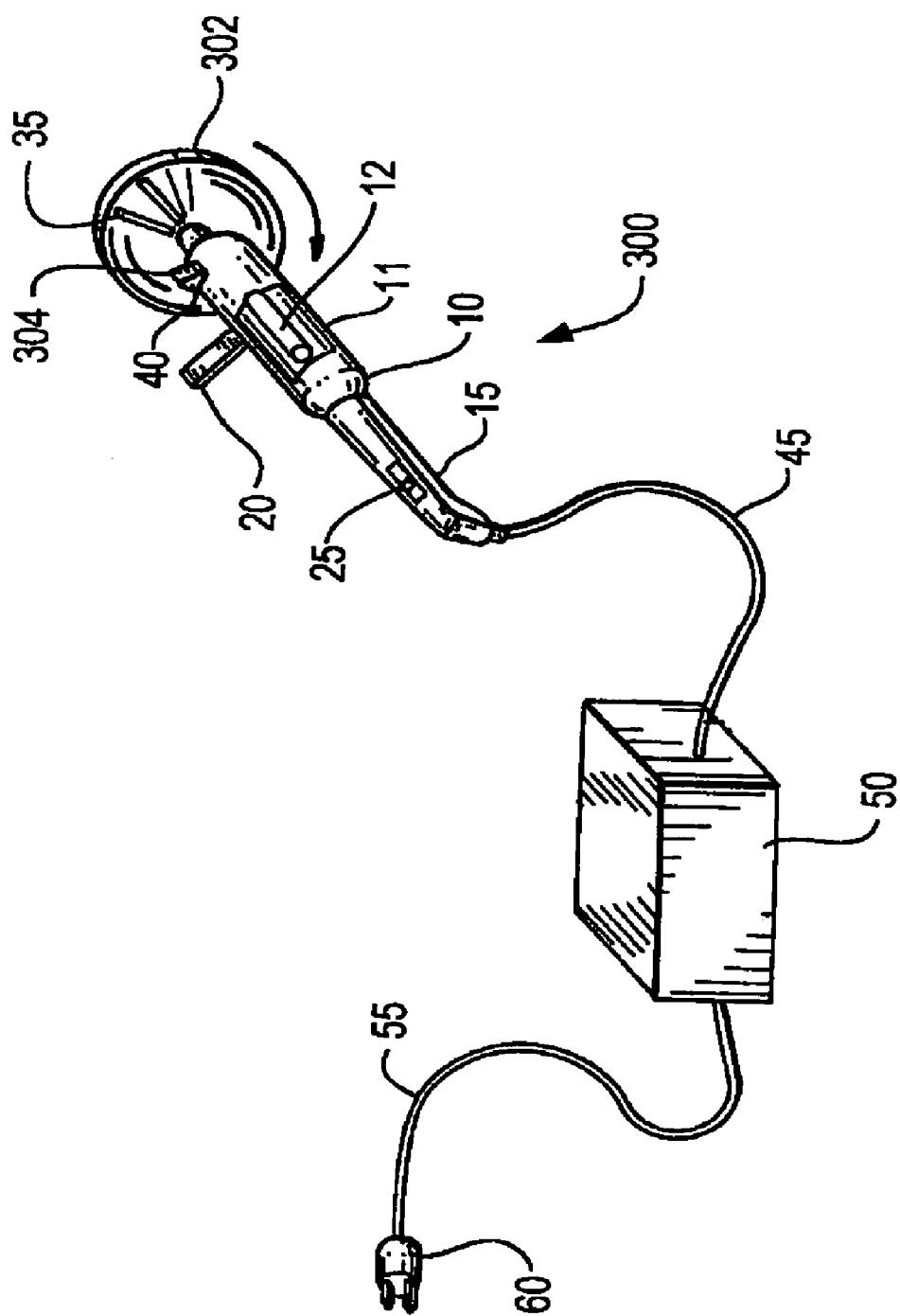
FIG. 1 is a diagram showing an electrically powered device capable of automatically setting the operating speed of a tool connected thereto according to a preferred embodiment of the invention in which an electrically powered device receives DC power from a separate power converter containing circuitry for automatically setting the operating speed of a tool.

Referring to FIG. 1, an electrically powered device 300 capable of automatically setting and/or adjusting the operating speed of a tool 302 connected thereto, such as grinder, according to a preferred embodiment of the generally includes a housing 11 having at least one handle for operating the device, such as an outside handle 20 and rear handle 15. Handle 15 further has an on/off switch 25 mounted thereto. Contained within housing 11 is a brushless DC ("BLDC") motor 12 or any other means for driving a tool 302, such as a grinding wheel, removably attached thereto. Also attached to or integral with the housing 11 is an emitter/detector housing 40 for housing a tool wear indicator component or a portion thereof. In a preferred embodiment, an electric power cord 45 for powering the motor 12 extends from the rear handle 15 to an external controller 50, which receives power via power cord 55 from a power source, such as with plug 60 connected thereto. Alternatively, or in addition, the controller 50 or a portion thereof may be internally mounted within the housing 11.

Figure 2:
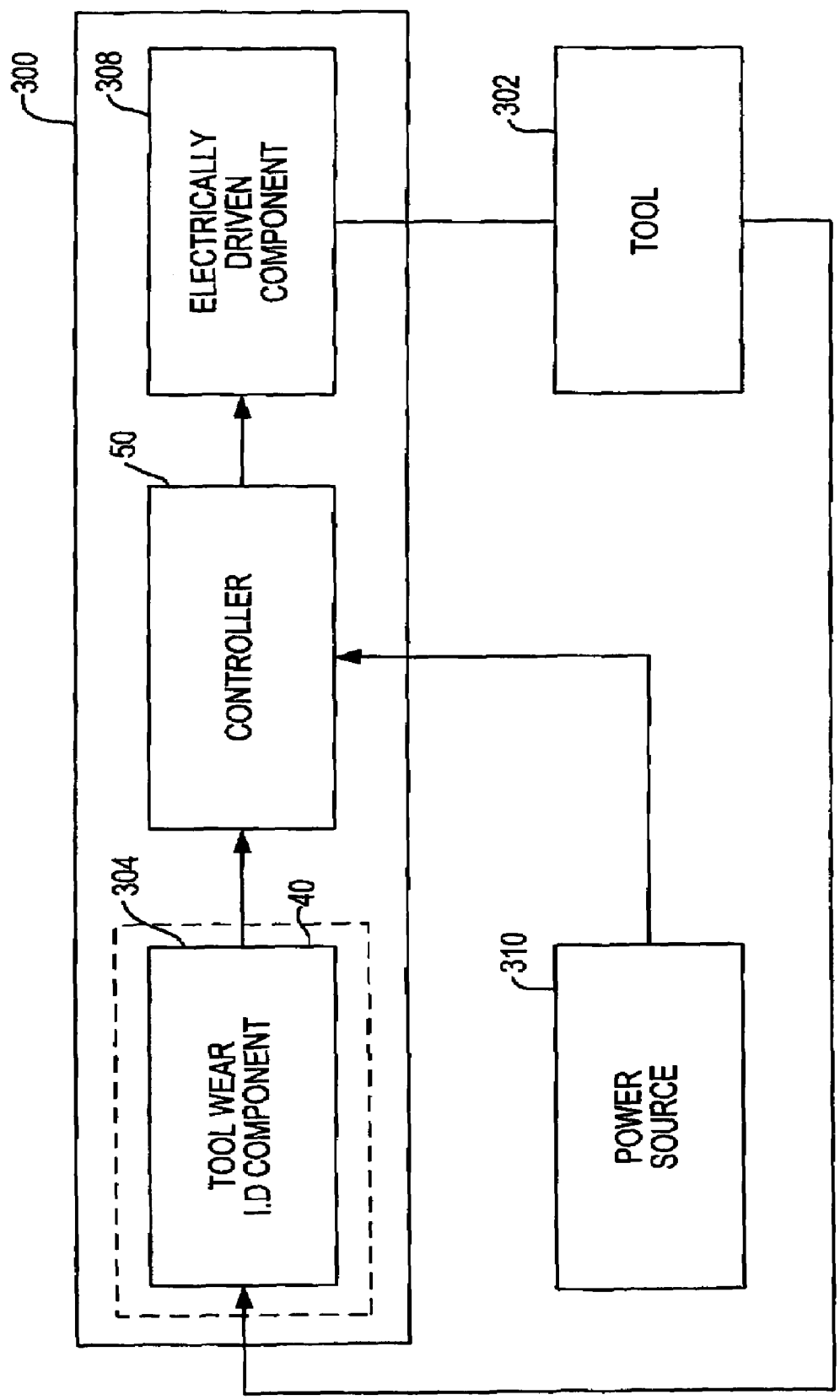
FIG. 2 is a block diagram showing the major components of an electrically powered device capable of automatically setting the operating speed of a tool connected thereto in which the preferred embodiments of the invention may be implemented.

Referring to FIG. 2, an electrically powered device 300, in which the preferred embodiments may be implemented, comprises several major components. In a preferred embodiment, the electrically powered device 300 includes a tool wear indicator component 301 and a controller 50 for driving an electrically powered component 308, such as a BLDC motor 12. The tool wear indicator component generally evaluates or otherwise determines tool wear and produces a tool wear signal that may be used to drive the tool based on the measured tool wear. Tool wear may be measured either directly or indirectly in a variety of ways. Generally, the tool wear indicator determines a value of a tool wear variable, i.e., a variable characteristic of the tool that varies as a function of tool wear, and produces the appropriate signal based on the tool wear variable or relative tool wear. The signal is provided to the controller 50 that adjusts the operating speed of the electrically powered component 308 to a predefined value based on the value of the tool wear variable. The particular tool wear variable used to evaluate tool wear is generally dependent upon the type of tool for which wear is being determined. The radius of a grinding wheel, for example, will vary as a function of wear and may thus be used as a variable to gauge wheel wear. Various other variables may also be used to gauge tool wear, such as resistance, inductance, capacitance, length, diameter, operating temperature, etc. In one embodiment, the device may further include a tool-identifying component 304 that reads indicia for identifying a particular tool 302 to be driven by the electrically powered component 308. The indicia may be used to determine the initial operating speed for a particular tool 302, which initial operating speed may adjusted to account for wear associated with the particular device 302. The tool 302 may further include a reflective coating to increase the reflective characteristics of the tool 302.

Figure 3A:
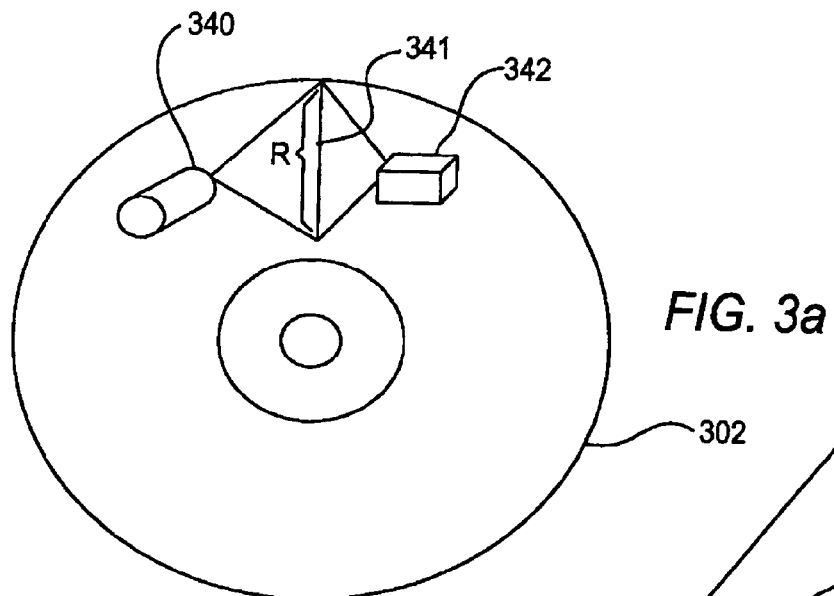
FIGS. 3a-3c show grinding wheels for use with the electrically powered device capable of automatically setting the operating speed of a tool connected thereto according to preferred embodiments of the invention.
Figure 3B:
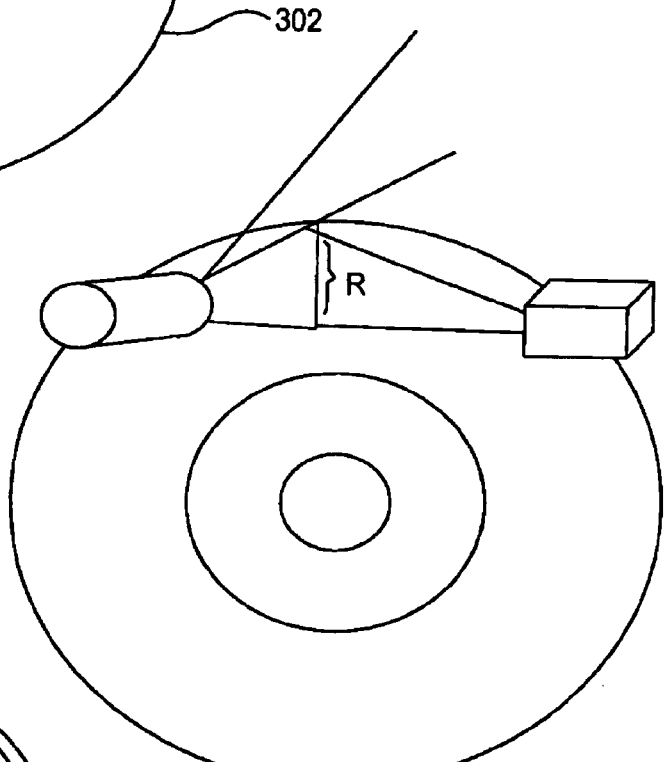

The device 300 may gauge tool wear and also identify the tool 302 in a variety of ways, including, but not limited to, with direct, optical, inductance, and capacitance reading/ measurement techniques. Referring to FIG. 3a, in a preferred embodiment, tool wear is determined using optical measurement techniques. In this instance, the tool wear indicator component includes a light emitter 340, such as a laser light emitter, that projects light onto the tool 302 and a light detector 342, such as a photo detector, that detects an aspect of the light, such as light intensity, reflected from the surface of the tool 302. Light is used herein to generally refer to electromagnetic radiation in both the visible and non-visible spectrum. In an preferred embodiment, the light emitter 340 projects a line 341 having a length R over at least the wearable portion of the radius of the grinding wheel 302. As the grinding wheel 302 wears, the radius of the grinding wheel gets smaller, and, as a result, the length R' of the projected line gets smaller in proportion to tool wear, as shown in FIG. 3b. In this instance, the difference between R and R', e.g., the difference or the reflected light intensities associated with R and/or R' may be used to gauge relative tool wear and adjust the operating speed of the device accordingly to reflect tool wear.

Figure 3C:
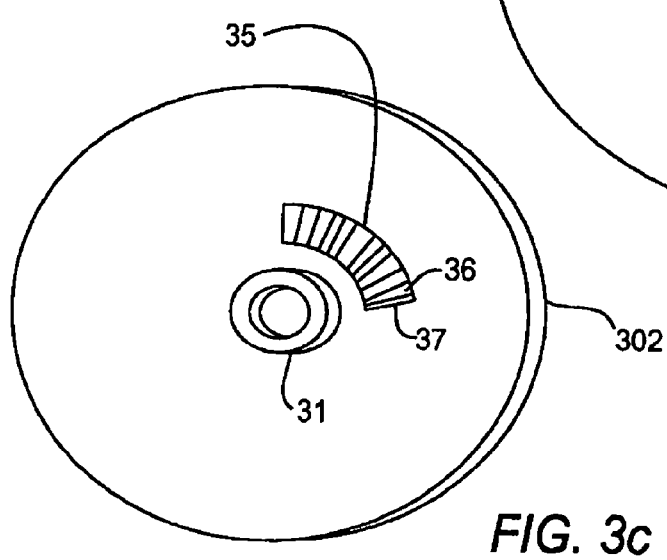

Referring to FIG. 3c, in a preferred embodiment of the invention, the tool 302, such as a grinding wheel, includes thereon indicia 35, such as a barcode, that may be used for identifying or otherwise recognizing the particular tool that is to be driven by the device 300. The indicia 35, e.g., the barcode having reflective areas 36 and non-reflective areas 37, is preferably placed on the inside surface of the grinding wheel 302 facing the tool as opposed to the working surface or the portion of the tool 302 that does not come into contact with the item to be machined. The grinding wheel includes a bushing 31, which is used to hold the wheel onto the electrically driven component 308, i.e., the motor shaft.

Figure 4A:
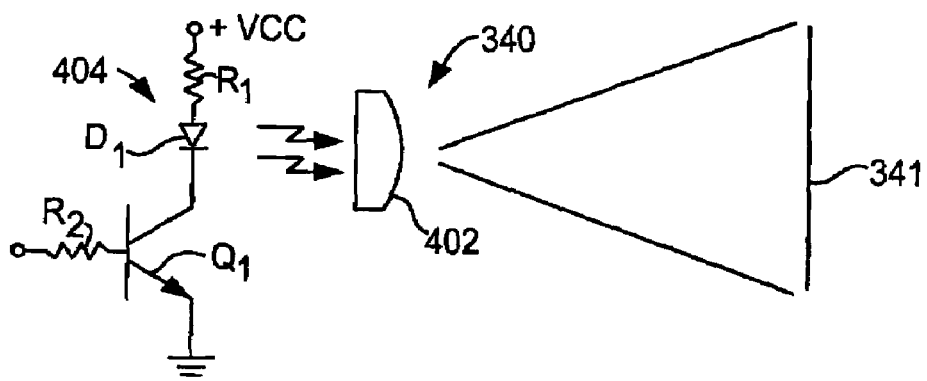
FIGS. 4a-4c are partial circuit diagram for a tool identifying components of the device according to preferred embodiments of the invention.
Figure 4B:
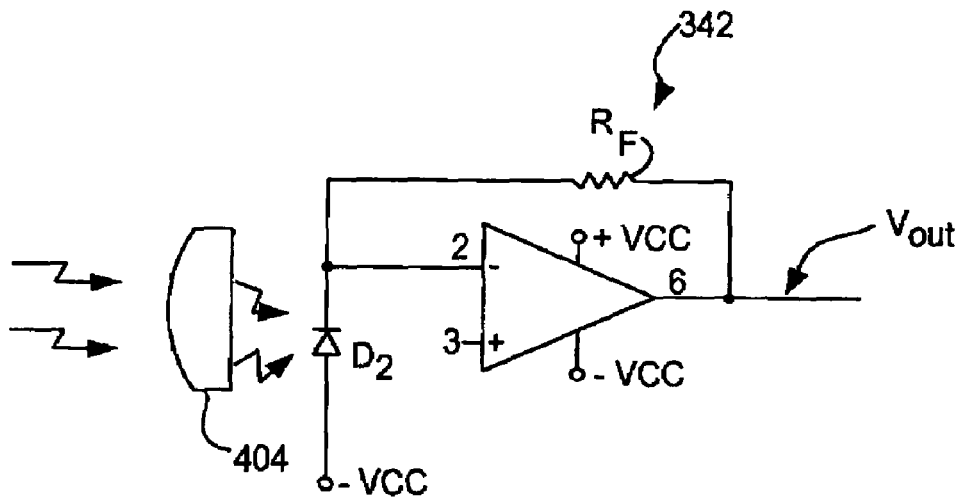

Referring to FIG. 4a, the light emitter 340, according to a preferred embodiment of the invention includes a light source 404 and a focusing lens 402. In this instance, the light source, such as diode D1, is energized when the power switch 25 is turned on and emits light that is focused through a focusing lens 402 to produce line 341 on the tool 302. Referring to FIG. 4b, the light detector 342, according to a preferred embodiment of the invention, includes a focusing lens 406 that receives light reflected from the tool 302 and focuses the reflected light toward a light detector, such as photodiode D2. The light detector, e.g. photodiode D2, generally varies the tool wear signal Vout from the light detector circuit based on the intensity of the reflected light, which is further a function of the length of the projected line 341. The light detector 342 may further include an op-amp configured as a transimpedance amplifier to amplify the signal to produce an amplified signal Vout. The light detector 342 will therefore produce an output signal that is proportionate to the length of the projected/reflected line 341, which is further a function of tool wear.

Figure 4C:
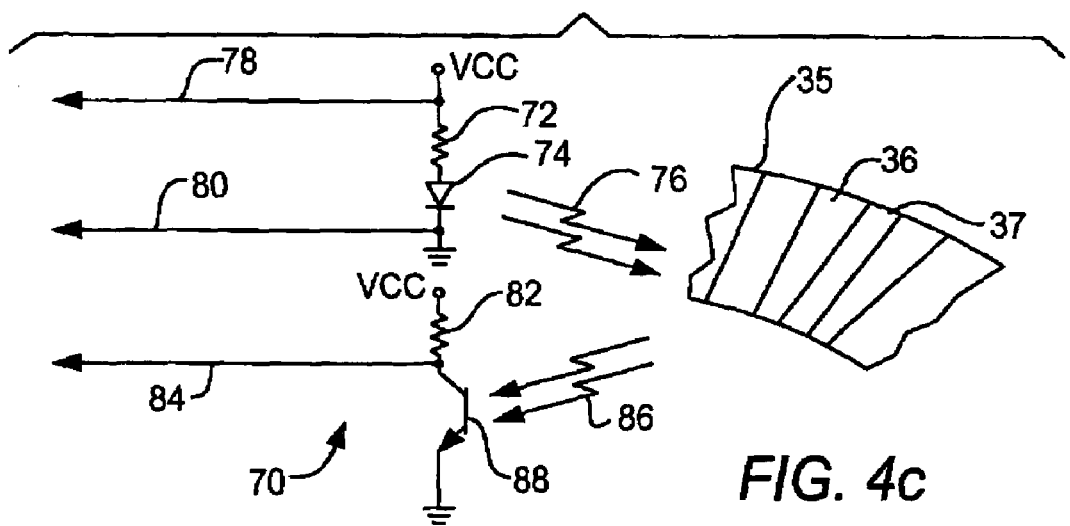

Referring to FIG. 4c, the tool identifying component according to a preferred embodiment of the invention includes a circuit 70 for optically reading bar code 35. Circuit 70 connects to Vcc power line 78, which powers circuit 70 and is contained within cord 45. Connected to Vcc is one end of resistor 72. The other end of resistor 72 connects to the anode of an infrared light emitting diode 74. The cathode end of the diode 74 connects to ground line 80. When energized, diode 74 emits infrared radiation 76, which is focused upon rotating bar code 35. Radiation 76 is absorbed by non-reflective areas 37 and reflected by reflective areas 36 back into the optical housing 40. Connected to Vcc is resistor 82 the other end of resistor 82 connects to the collector of phototransistor 88 that is positioned within housing 40 to receive reflected radiation 86. Signal line 84 connects to the collector of transistor 88.

Figure 5:
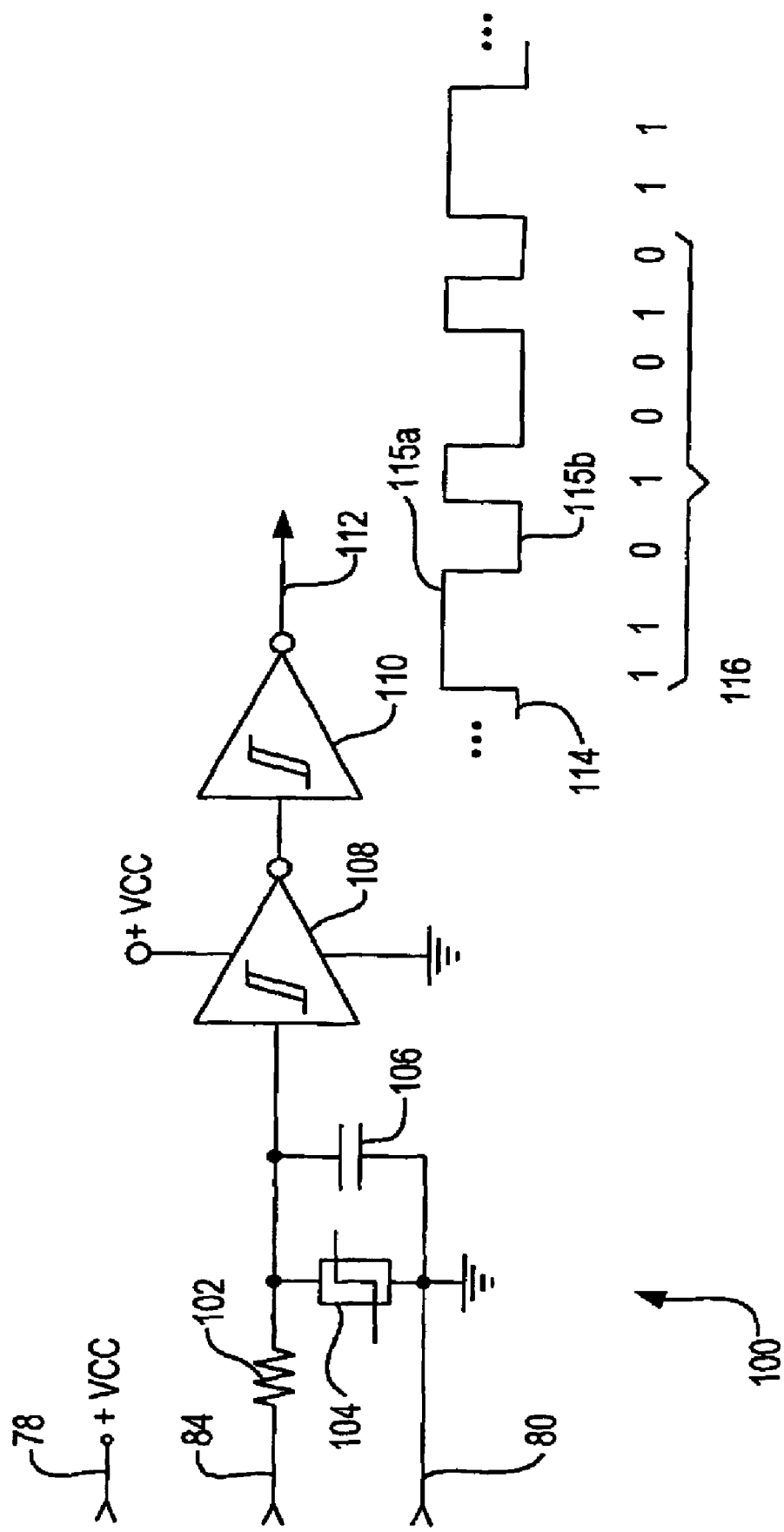
FIG. 5 is a partial circuit diagram for shaping a signal received from a bar code reader according to a preferred embodiment of the invention.

Referring to FIG. 5, the tool identifying component according to a preferred embodiment of the invention further includes a signal shaping circuit 100, which generally converts the optical/analogue identifying signal from signal line 84 into a digital identifying signal. This may be accomplished by connecting signal line 84 to one end of resistor 102. The other end of resistor 102 connects to transient voltage suppressor 104 and to one end of capacitor 106 and to the input of a Schmitt inverter 108. The other ends of suppressor 104 and capacitor 106 connects to ground. Power is supplied to circuit 70 via line 78 and ground line 80. The output of inverter 108 is connected to the input of the Schmitt inverter 110 and the output of inverter 110 is placed onto line 112. Resistor 102 and capacitor 106 form a low pass filter for the input of inverter 108 to filter high frequency noise on line 84. Suppressor 104 may be used to protect against any voltage spikes induced by motor power lines contained in cord 45. The signals placed on line 112 will be of form 114 having a sequence of digital logic levels 115a and 115b representing a binary word 116 derived from the indicia for identifying the tool 35.

Figure 6:
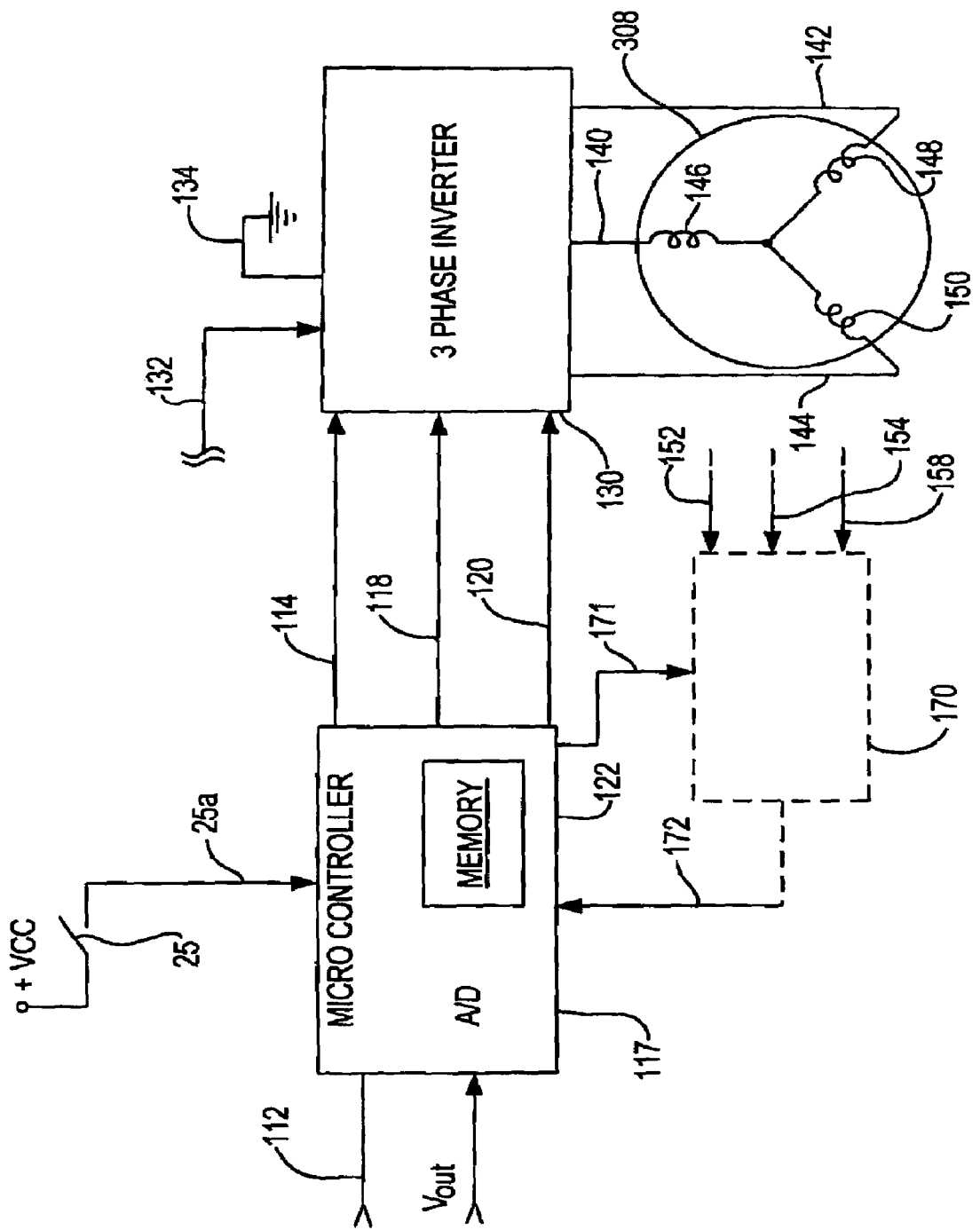
FIG. 6 is a partial circuit diagram for an electrically powered device capable of automatically setting the operating speed of a tool connected thereto according to a preferred embodiment of the invention.

Referring to FIG. 6, the controller component 50 according to a preferred embodiment of the invention includes at least one microcontroller 117, preferably having memory 122 associated therewith, for controlling the operating speed of the tool based on identifying signal(s) received from the tool identifying component. In this respect, the tool wear signal from the light detector circuit and/or from line 112 is communicated to the microcontroller 117 via one or more input pins thereon. Microcontroller 117 sends motor winding phase control signals 119, 118 and 120 to a three-phase inverter 130. A program is preferably stored in memory 122, which generates the operating signals on lines 118, 119, and 120 to drive the electrically driven component 308 based on the identifying signal from the tool identification component 301 and/or the tool wear signal from the tool wear indicator component 301. A high voltage line 132 connects to inverter 130 and, along with ground connection 134, to supply power to drive e.g., the motor 12. Inverter 130 supplies power in the proper phase sequence via limes 140, 142, and 144 to motor windings 146, 148, and 150, respectively, in response to the operating signals from lines 118, 119, and 120.

In a preferred embodiment, the tool wear signal from the light detector circuit flows to an analog/digital input (A/D) pin of microcontroller 117. The microcontroller 117 is thereby able to sense the tool wear signal and adjust the operating speed of the tool 302 to account for tool wear. Microcontroller 117 generally samples tool wear signal Vout and makes corresponding adjustments to the operating speed of the device. For example, the radius of a grinding wheel gets smaller as the wheel wears. In this instance, the amount of light reflected from the grinding wheel and thus the intensity of the light reflected will similarly be smaller as a function of the radius or the wear of the grinding wheel. The microcontroller 117 may then adjust the operating speed, e.g., increase the operating speed of the wheel, as the grinding wheel wears. The operating speed may therefore be adjusted to maintain the velocity at the circumference of the grinding wheel essentially constant or with a desired range.

Back EMF circuitry contained within block 170 receives voltages appearing on lines 140, 142, and 144 via lines 152, 154 and 158, respectively, and provides an output signal onto line 172 to indicate the zero crossing of the non energized line of either lines 140, 142, and 144, which is further provided as input to microcontroller 117. Microcontroller 117 receives the signal placed onto line 172 to determine the appropriate phase control signal to be activated i.e., for lines 118, 119, and 120, to drive the electrical component 308 at the desired operating speed. The phase control signal or signals is produced based on at least one control algorithm stored in memory 122. The selection of the appropriate control signal to operate the electrical component is discussed below in greater detail. Microcontroller 117 sends a multiplexing signal onto line 171 for selectively multiplexing or otherwise selecting which signals from lines 152, 154, or 158 will be placed onto line 172. The microcontroller 117 is further responsive to a signal placed onto line 25a by on/off switch 25.

Microcontroller 117 is preferably an application specific controller designed for BLDC control su-ch as Motorola's MC68HC08MR32 or equivalent microcontroller series. Microcontroller 117 contains memory 122 comprising flash memory 122a and RAM memory 122b. Flash memory 122a contains an algorithm to effectively commute and run BLDC motor 308. RAM memory is used to temporarily store program variables, which can be altered such as rotational tool speed data. Additionally, microcontroller 117 contains pulse width modulation ("PWM") outputs, which drive lines 118, 119 and 120 lines and other I/O lines for effective BLDC motor control.

Figure 7:
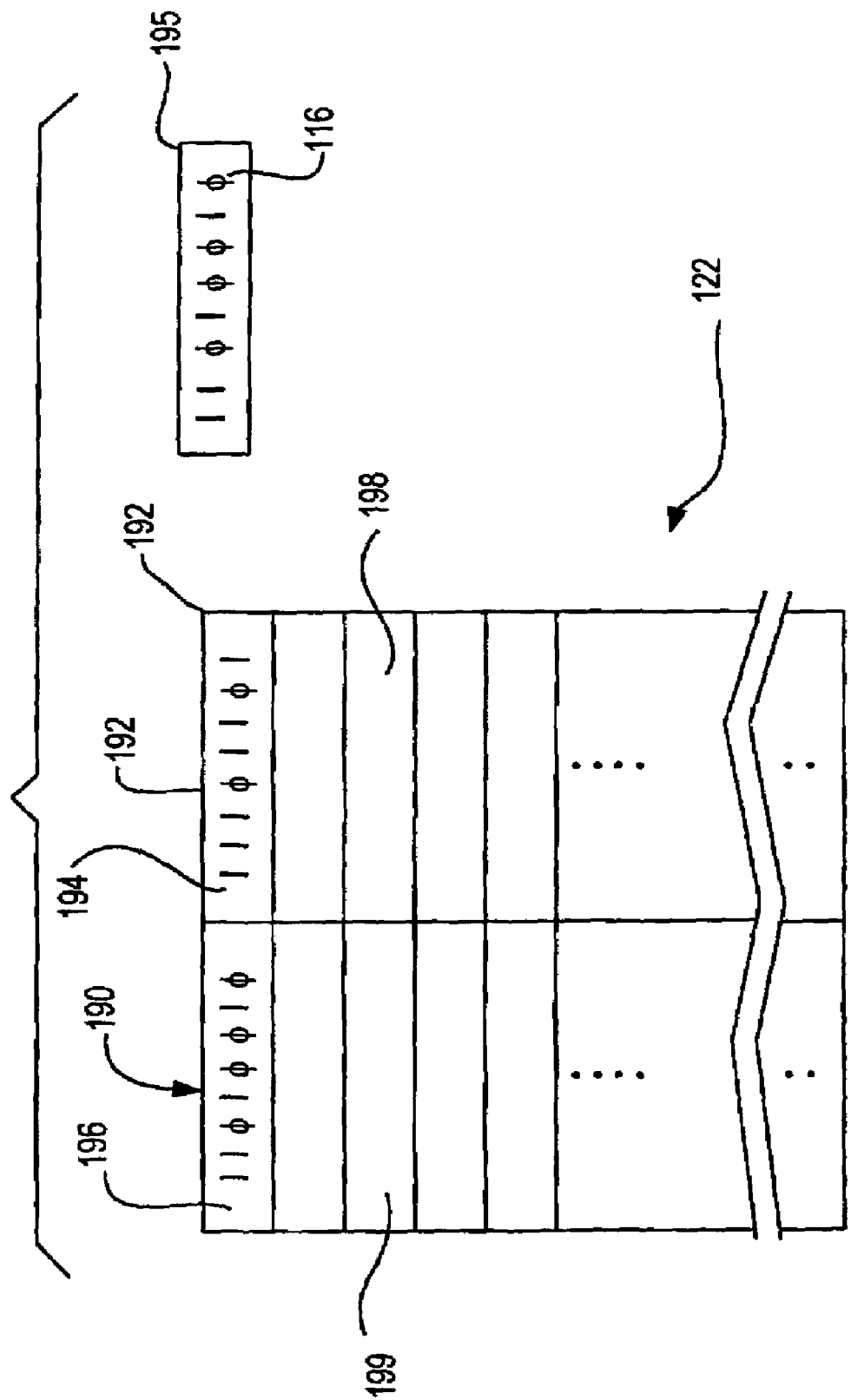
FIG. 7 is block diagram showing memory and memory registers for use in identifying a tool according to a preferred embodiment of the invention.

FIG. 7 illustrates memory and memory registers for use in identifying a tool according to a preferred embodiment of the invention. Memory 122 is made up of a plurality of segments 192 each of which is made up of memory registers 190. Memory 122 preferably includes a first segment 190 that includes a plurality of contiguous memory locations 199 and a second segment 192 that includes a plurality of corresponding and associated contiguous memory locations 198. Memory locations 199 associated with the first segment 190 include a list of the data words 116 corresponding to the indicia 35 for identifying particular tools to be driven by the device. The associated memory locations 198 for the second segment 192 include a binary representation of the operating speed, e.g., the rotational speed, of the tool 302 for each of the data words 116 stored in the corresponding memory locations 199. Register 194 is shown storing binary word 116. The identifying signal from line 112 is generally compared with the list of data words 116 in the first segment 190 to determine the desired initial operating speed from the second segment 192 for the particular tool 302. Within table 199 is stored a list of all possible binary words 166 which correspond to the signal placed onto line 112 and to the barcode 35.

Figure 8:
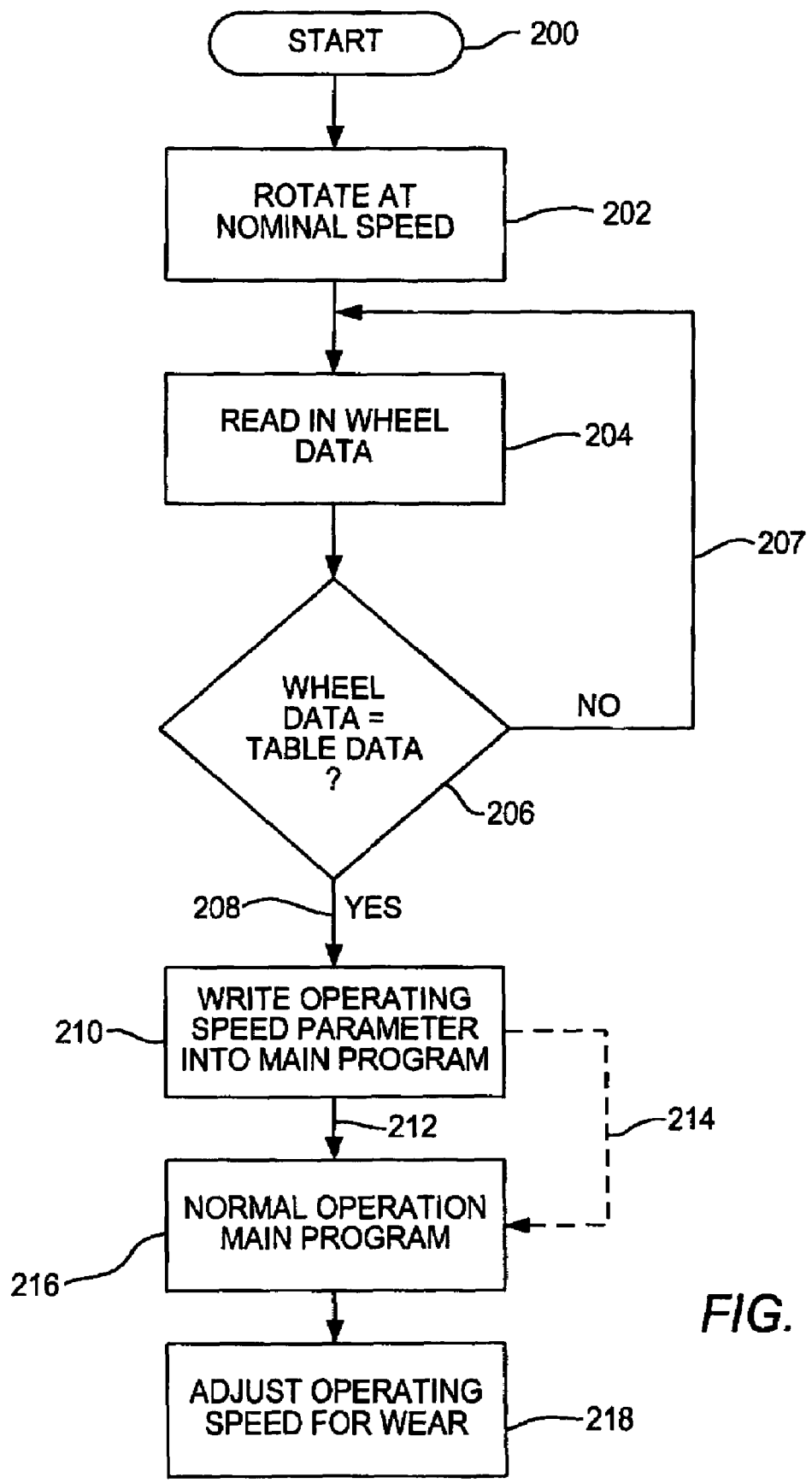
FIG. 8 is a flow diagram for automatically adjusting the operating speed of a tool according to a preferred embodiment of the invention.

Referring to FIG. 8, a method for automatically adjusting the operating speed of a tool, according to a preferred embodiment of the invention, begins with the user placing switch 25 in the on positioning. In response to the on/off signal placed onto line 25a and in response to the signal placed onto line 172, microcontroller 117 sends the appropriate sequence of signals onto lines 118, 119 and 120 to control the application of high voltage 132 to motor windings 146, 148 and 150 via inverter 130. Power flows to motor windings via lines 140, 142 and 144 from inverter 130 as is indicated in step 200. In response to the signal placed onto line 172 and in response to the control algorithm contained within memory 122, microcontroller 117 sequences the signals placed onto lines 118, 119 and 120 to properly commutate the application of power to the electrically driven component 308, e.g., the motor 12. In one embodiment, Motor 12 then begins at step 202 to rotate initially at a nominal speed for the tool identifying component to read the indicia or barcode 35 on the tool 302. In a preferred embodiment, the motor 12 rotates a grinding wheel and in so doing periodically rotates the bar code in front of circuit 70, which emits infrared radiation 76. Reflective surfaces 36 reflect the infrared radiation 76 as the barcode passes before the circuit 70 to form reflective energy 86, which activates photodiode 88 to place a low signal onto line 84. Non-reflective surface 37 absorbs radiation 76 and thus do not form reflective energy 86, which causes photodiode 88 to place a high signal onto line 84 when not activated. A sequence of low and high signals are therefore placed onto line 84 that directly correspond to the bar code placed onto wheel.

The sequence of signals placed onto line 84 may then be filtered and shaped by circuit 100 to form a serial data sequence 114 of low and high digital signals 115a and 115b respectively. Alternatively or in addition, the tool wear indicator component evaluates tool wear, e.g., light emitter 340 emits a light that is reflected off of the tool 302 and received by light detector 342 to produce a wear signal that is a function of the reflected light intensity. Microcontroller 117 reads the identifying signal, e.g., the serial data 114, which forms data word 116 and/or the wear signal, as indicated in step 204. Word 116 represents the wheel data defined by the bar code. Microcontroller 117 then writes data word 116 into a register of memory 122.

The microcontroller 117 may then compare data word 116 stored in register 195 with the data stored in the memory's first segment 199 starting with the first entry 196. If at step 206 no match occurs, microcontroller 117 then addresses the next memory location of the first segment 199 and compares the data stored in the next memory location with register 195 data until a match is found. When a match occurs, microcontroller 117 then writes the corresponding data from the associated memory location of the second segment 198 into a rotational speed data memory location within the normal operation main program indicted by step 210. Microcontroller 117 then executes the normal operating program 216 to set the speed of motor 12 and thereby the operating speed of the tool 302 using the rotational speed data. Microcontroller 117 may then adjust the operating speed of the device to account for tool wear as indicated at step 218. The microcontroller 117 preferably samples tool wear, i.e., the tool wear signal, continuously to provide control with regard to the operating speed of the tool 302 based on real time tool wear determinations. The microcontroller 117 may further stop the tool 302 if tool wear exceeds the tool's wear limits.

While the foregoing preferred embodiments of the invention have been described in some detail for purposes of clarity and understanding, it will be appreciated by one skilled in the art, from a reading of the disclosure, that various changes in form and detail can be made without departing from the scope of the invention, which is defined exclusively by the appended claims.

What is claimed is:

1. A portable electric power tool with automatically adjusting operating speed, the tool comprising:
    circuitry that evaluates the operating speed of the tool and that produces a speed related signal;
    a microcontroller receiving the speed related signal and outputting a speed control signal;
    a memory having a list of operating speeds stored therein, the microcontroller setting the initial nominal operating speed for the tool from the list in the memory; and
    circuitry to operate the tool initially at the initial nominal operating speed set by the microcontroller and that automatically adjusts the operating speed of the tool based on the speed control signal output from said microcontroller.

2. The tool of claim 1, wherein the circuitry that evaluates the operating speed of the tool is operable for determining a value of a tool wear variable as a function of the wear of a working part.

3. The tool of claim 2, wherein the working part is one of a grinding wheel and a cutoff wheel, each having a radius associated therewith, and wherein the tool wear variable reflects the radius of the working part.

4. The tool of claim 3, wherein the circuitry that automatically adjusts the operating speed of the tool adjusts the operating speed of the tool based on a determination of the radius of the working part.

5. The tool of claim 1, wherein the circuitry that automatically adjusts the operating speed of the tool enables:
    the tool to be operated at any one of a discrete number of operating speeds.

6. The tool of claim 5 wherein the microcontroller adjusts the speed control signal of the tool to coincide with operational preferences for using the tool.

7. The tool of claim 6, wherein the operational preferences include preferences for increasing the operating speed of the tool from said initial nominal operating speed.

8. The tool of claim 6, wherein the speed control signal is produced based on at least one control algorithm stored in said memory.

9. The tool of claim 1, wherein the tool comprises indicia for identifying the working part and wherein the device comprises:
    circuitry that reads the indicia for identifying the working part and produces a signal for identifying the particular working part removably connected to the devise; and
    circuitry that sets said initial nominal operating speed for the particular working part based on the identifying signal.

10. The tool of claim 9, wherein the indicia for identifying the working part comprises a barcode.

11. The tool of claim 10, wherein the circuitry that reads the indicia for identifying the working part produces an analogue identifying signal and wherein the tool comprises circuitry that converts the analogue identifying signal into a digital identifying signal.

12. The tool of claim 1, wherein the tool drives the working part removably connected thereto with a brushless DC motor.

* * * * *

UNITED STATES PATENT AND TRADEMARK OFFICE
CERTIFICATE OF CORRECTION

PATENT NO. : 7,489,856 B2  Page 1 of 1
APPLICATION NO. : 10/877636
DATED : February 10, 2009
INVENTOR(S) : William R. Haller It is certified that error appears in the above-identified patent and that said Letters Patent is hereby corrected as shown below:

Title page item [73] Assignee: states "Nokia Corp" replace with "Thor Power Corp"

Column 8, line 5 add "," after claim 5

Signed and Sealed this

Thirtieth Day of March, 2010

David J. Kappos
*Director of the United States Patent and Trademark Office*